US012592225B1

(12) United States Patent
Ahmad et al.

(10) Patent No.: US 12,592,225 B1
(45) Date of Patent: Mar. 31, 2026

(54) SYSTEMS AND METHODS TO PROVIDE ACTION RECOMMENDATIONS BASED ON AUDIO INFORMATION

(71) Applicant: Suki AI, Inc., Redwood City, CA (US)

(72) Inventors: Feroz Ahmad, Sunnyvale, CA (US);
Bahador Saket, Foster City, CA (US);
Rohan Kalantri, Sunnyvale, CA (US)

(73) Assignee: Suki AI, Inc., Redwood City, CA (US)

( * ) Notice: Subject to any disclaimer, the term of this patent is extended or adjusted under 35 U.S.C. 154(b) by 188 days.

(21) Appl. No.: 18/529,399

(22) Filed: Dec. 5, 2023

(51) Int. Cl.
*G10L 15/18* (2013.01)
*G10L 15/22* (2006.01)

(52) U.S. Cl.
CPC .............. *G10L 15/18* (2013.01); *G10L 15/22* (2013.01); *G10L 2015/225* (2013.01)

(58) Field of Classification Search
None
See application file for complete search history.

(56) References Cited

U.S. PATENT DOCUMENTS

| | | | | | |
|---|---|---|---|---|---|
| 12,353,462 | B1 * | 7/2025 | Ahmad | ............... | G06F 16/3326 |
| 2018/0137419 | A1 * | 5/2018 | Byron | .................... | G06N 5/022 |
| 2018/0150739 | A1 * | 5/2018 | Wu | ......................... | G06N 20/10 |
| 2018/0225375 | A1 * | 8/2018 | Collins | ................. | G06F 16/951 |
| 2021/0375271 | A1 * | 12/2021 | Persing | .................... | G06F 40/30 |
| 2021/0406734 | A1 * | 12/2021 | Pont | ......................... | G08G 5/56 |

| | | | | | |
|---|---|---|---|---|---|
| 2024/0331686 | A1 * | 10/2024 | Wei | ..................... | G06N 3/0455 |
| 2025/0045532 | A1 * | 2/2025 | Gado | ...................... | G06F 40/30 |
| 2025/0156652 | A1 * | 5/2025 | Zhou | ................... | G06F 11/3428 |

OTHER PUBLICATIONS

Bordes A, Boureau YL, Weston J. Learning end-to-end goal-oriented dialog. arXiv preprint arXiv:1605.07683. May 24, 2016. (Year: 2017).*

De Souza Pereira Moreira G, Rabhi S, Lee JM, Ak R, Oldridge E. Transformers4rec: Bridging the gap between nlp and sequential/session-based recommendation. InProceedings of the 15th ACM conference on recommender systems Sep. 13, 2021 (pp. 143-153). (Year: 2021).*

* cited by examiner

*Primary Examiner* — Jonathan C Kim
(74) *Attorney, Agent, or Firm* — Esplin & Associates, PC

(57) ABSTRACT

Systems and methods to provide action recommendations based on audio information are disclosed. Exemplary implementations may: obtain audio information that represents sounds captured by a client computing platform; generate, by performing speech recognition on the audio information, a first transcript; determine, based on the first transcript, individual prospective pairs that include a spoken action and one or more spoken entities included in the first transcript; determine whether the spoken actions included in the prospective pairs are included in a predefined list of actions; provide, responsive to determination that the spoken actions are included in the predefined list, to the trained action determination model; obtain, from the trained action determination model, the executable actions; determine whether individual ones of the executable actions are already fulfilled; effectuate, responsive to the individual executable actions not already being fulfilled, presentation of action recommendations that include the executable actions via a device of the caregiver.

14 Claims, 5 Drawing Sheets

SYSTEMS AND METHODS TO PROVIDE ACTION RECOMMENDATIONS BASED ON AUDIO INFORMATION

FIELD OF THE DISCLOSURE

The present disclosure relates to systems and methods to provide action recommendations based on audio information.

BACKGROUND

During a caregiver-subject interaction, the caregiver and the subject may be discussing matters that require effectuation of actions by the caregiver so that proper care may be provided to the subject. Each of the actions may require extensive manual user input by the caregiver during or after the caregiver-subject interaction.

SUMMARY

One aspect of the present disclosure relates to a system configured to train an action determination model to determine executable actions based on spoken actions and spoken entities. The action determination model may be trained based on training information to determine executable actions (i.e., output) based on prospective pairs of spoken actions and one or more spoken entities (i.e., input) that are determined from transcripts.

Another aspect of the present disclosure relates to a system configured to provide action recommendations based on audio information. The transcripts that include the prospective pairs may be generated based on audio information obtained. The audio information may be captured via a client computing platform and conveying utterances between participants during conversation sessions. A determination of whether the spoken actions are included in or refer to an action included in a predefined list of actions may be performed. Upon determination that the spoken actions are included in or refer to an action included in the predefined list, the prospective pairs may be input to the action determination model. The executable actions may be output and obtained from the action determination model. Upon determination that the individual executable actions are viable and not previously fulfilled, action recommendations may be generated and presented, to the caregiver via the client computing platform, that include the executable action that the caregiver may elect to effectuate or archive.

As such, a system that enables users, e.g., the caregiver, to naturally speak with the subject and/or other participants without manually performing actions related to relevant topics spoken about (e.g., appointments, medications) and/or overlooking the actions is provided. The system may eliminate requirements of existing systems to provide explicit commands in accordance with predefined syntax to initiate such actions where the existing systems analyze the structure of the spoken command rather than substantial spoken entities and spoken actions that are relevant in the utterances and to the subject. As such, the system may increase speed and efficiency in action effectuation and accuracy in care provided.

The system may include electronic storage, one or more hardware processors configured by machine-readable instructions, and/or other components. The electronic storage may store an action determination model, training information, a trained action determination model trained to determine executable actions within a first conversation session represented by a first transcript, a predefined list of actions that are executable to provide care for subjects, and/or other information. In some implementations, the action determination model and the training information may be stored in a separate electronic storage. The trained action determination model may be similar to the action determination model but trained based on the training information. The training information may include transcripts of conversation sessions, action-entity pairs present in the transcripts, final executed actions, the predefined list of actions, and/or other information. Individual ones of the executable actions specify one or more entities and one of the actions from a predefined list to be employed relative to the one or more entities.

The machine-readable instructions may include one or more instruction components. The instruction components may include computer program components. The instruction components may include one or more of information model obtaining component, model training component, obtaining component, transcript generating component, pair determination component, model utilizing component, feasibility component, recommendation effectuating component, model obtaining component, model training component, and/or other instruction components.

The model obtaining component may be configured to obtain the action determination model. The model obtaining component may be configured to obtain the training information.

The model training component may be configured to train the action determination model to determine executable actions within the conversation sessions represented by the transcripts. The transcripts, the action-entity pairs, and the predefined list of actions may be used as training inputs, and the final executed actions may be as the training outputs such that the action determination model is trained to determine executable actions.

The information obtaining component may be configured to obtain audio information that represents sounds captured by a client computing platform. The sounds convey utterances from participants during the first conversation session. The participants may include a caregiver and a subject.

The transcript generating component may be configured to generate, by performing speech recognition on the audio information, a first transcript representing the utterances by the participants.

The pair determination component may be configured to determine, based on the first transcript, individual prospective pairs that include a spoken action and one or more spoken entities included in the first transcript. The pair determination component may be configured to determine whether the spoken actions included in the prospective pairs are included in the predefined list of actions.

The model utilizing component may be configured to provide, responsive to determination that the spoken actions are included in the predefined list, the prospective pairs to the trained action determination model. The model utilizing component may be configured to obtain, from the trained action determination model, the executable actions.

The feasibility component may be configured to determine whether individual ones of the executable actions are viable and already fulfilled based on external resources. The external resources may indicate at least schedules, resource inventory, resource fulfillment information, and/or other information.

The recommendation effectuating component may be configured to effectuate, responsive to the individual executable actions being viable and not already fulfilled, presentation of action recommendations that include the executable actions via the client computing platform of the caregiver.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1A:
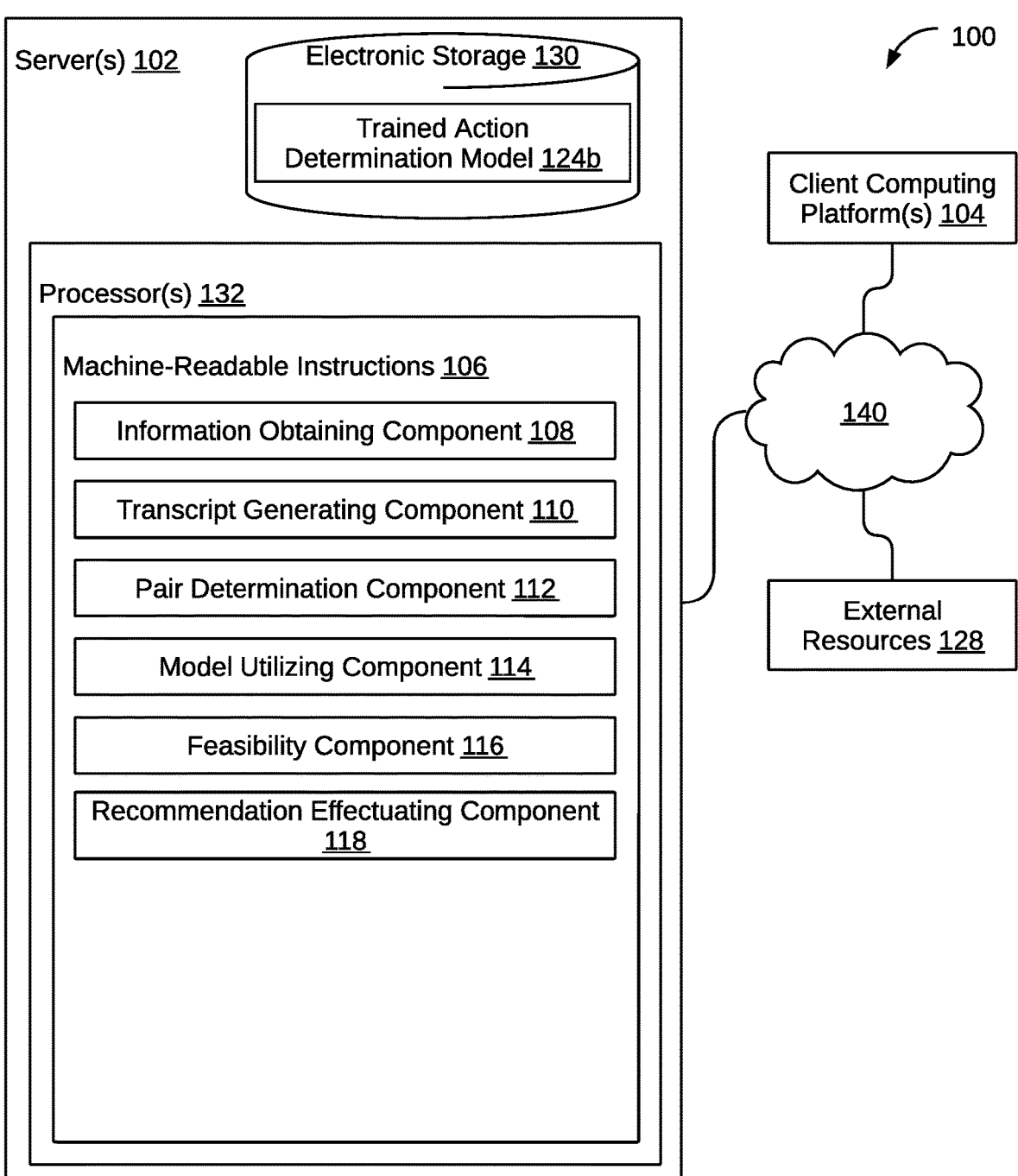
FIG. 1A-B illustrates a system configured to provide action recommendations based on audio information, in accordance with one or more implementations.
Figure 1B:
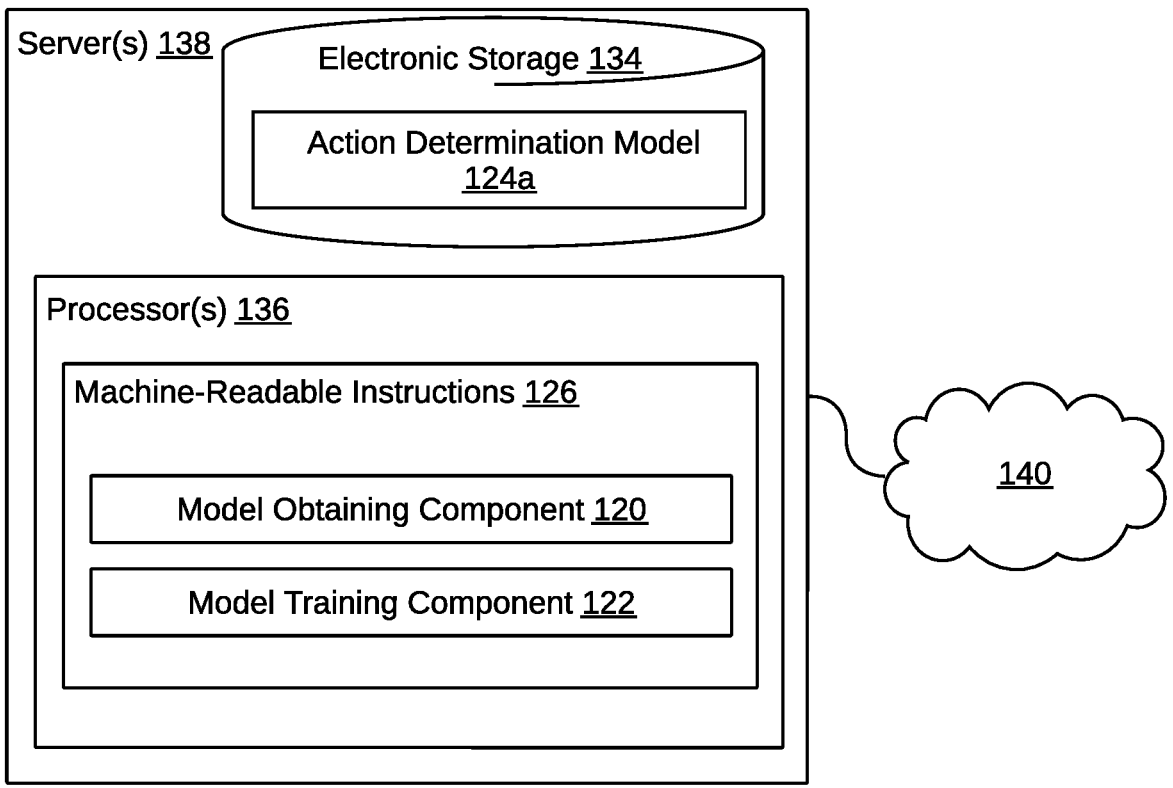

FIG. 1A-B illustrate a system 100 configured to train and utilize an action determination model to action recommendations based on audio information, in accordance with one or more implementations. In some implementations, system 100 may include one or more servers 138 of FIG. 1B, electronic storage 134 of FIG. 1B, one or more servers 102 of FIG. 1A, electronic storage 130 of FIG. 1A, and/or other components. Server(s) 102 may be configured to communicate with one or more client computing platforms 104 via network 140 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Referring to FIG. 1B, electronic storage 134 may be similar to electronic storage 130 of FIG. 1A described herein, but included in server(s) 138. In some implementations, electronic storage 130 and electronic storage 134 may communicate via network 140 (the same as in FIG. 1A) or may be the same storage media (e.g., cloud storage), and thus store the same information.

Electronic storage 134 may store at least action determination model 124a, training information, and/or other information. The training information may include (i) transcripts of conversation sessions (ii) action-entity pairs present in the transcripts, (iii) final executed actions, (iv) predefined list of actions, and/or other training information.

The transcripts included in the training information may be textualized representations of past conversation sessions between participants that are used to train action determination model 124a. The participants in the individual past conversation sessions may include one or more caregivers, a subject, and/or other participants.

The predefined list of actions may be actions that are executable by system 100 in response to provocation by a caregiver or user of system 100. By way of non-limiting example, the actions may include scheduling an appointment, sending a message to a particular person, ordering imaging (e.g., X-ray, ultrasound), ordering prescriptions, ordering testing (e.g., particular blood tests), and/or other actions. It is to be understood that the actions described herein are for exemplary purposes only and are not intended to be limiting as the functionalities described herein may be applied in various other fields. Electronic storage 130 in FIG. 1A and/or electronic storage 134 may store functions, code, or otherwise a specification that may be executed with one or more entities in correspondence to individual ones of the actions.

Individual spoken actions may be spoken by individual participants in the past conversation sessions. The individual spoken actions may refer to individual ones of the actions in the predefined list. Individual ones of the action-entity pairs may include a spoken action from the transcripts and one or more spoken entities related to the spoken action of the pair. The spoken entities may be values for parameters or values that otherwise specify information related to or about the subject of which were uttered by one of the participants. The training information may include sets of duplicate ones of the action-entity pairs. The duplicates may represent that a particular spoken action and one or more of the spoken entities related to the particular spoken action may have been spoken multiple times in a given conversation session. For example, within the given conversation session, scheduling (i.e., the action) a particular appointment (i.e., a first spoken entity) at a particular date (i.e., a second spoken entity) may have been uttered more than once. Thus, a first action-entity pair and a second action-entity pair that is identical to the first action-entity pair may be derived from the given conversation session. In some implementations, the individual actions may be associated with a set of alternative references that may be uttered and refer to the individual actions. The sets of alternative references may be stored in electronic storage 134, electronic storage 130 of FIG. 1A, and/or other storage. For example, a first action may be "schedule" or variations thereof, a first alternative reference may be "book" or variations thereof, a second alternative reference may be "reserve" or variations thereof.

In some implementations, the entities may be categorized into different entity classes. The entity classes may be different sets of related features and parameters that may be discussed during the conversation sessions, and in some implementations, included in notes as they are being automatically populated. The notes may include medical notes, legal notes, mechanical notes, and/or notes specific to other knowledge domains. The entity classes and notes described herein may be related to the medical knowledge domain for exemplary purposes and is not intended to be limiting. The medical knowledge domain may refer to terms, phrases, entities, literature, transcripts, values, and/or other information that are related to medicine. However, other knowledge domains may be utilized additionally or alternatively such as education, auto mechanics, among others. By way of non-limiting example, the entity classes may include at least complaints, allergies, conditions, medications, procedures, medical devices, appointments, and/or other entity classes. In some implementations, the entity classes stored may be modified by the users adding and/or removing one or more entity classes via client computing platforms 104.

The entities in the individual entity classes may include, for example, breathlessness, tiredness, fatigue, pain, fever, swelling, rashes for the complaints entity class. As another example, the entities for the allergies entity class may include tree nuts, soy, gluten, dairy, among other allergies. As another example, the entities for the conditions entity class may include Alzheimer's, arthritis, chickenpox, diabetes, pneumonia, tonsillitis The entities for the medications entity class may include Tylenol, Aleve, Atenolol, Tenormin, among other conditions. As another example, the entities for the procedures entity class may include appendectomy, cataract surgery, colectomy, knee replacement, among other procedures. As another example, the entities for the medical devices entity class may include crutch, pacemaker, pulse oximeter, ventilator, among other medical devices. As another example, the entities for the appointments entity class may include a follow-up, routine care, an urgent visit, an office visit, among other appointments.

The final executed actions may refer to one of the actions from the predefined list that were executed in relation to one or more of the entities. The final executed actions may be distinct. The final executed actions may include a single one of the action-entity pairs from the sets of duplicates. The final executed actions may be executed subsequent to the generation of the respective transcripts for the past conversation sessions. Thus, the final executed actions may signify executable actions that action determination model 124a is being trained to determine.

Server(s) 138 that may be configured by machine-readable instructions 126 of processor(s) 136. Machine-readable instructions 126 may include one or more instruction components. As described herein, server(s) 138 may be similar to server(s) 102 of FIG. 1A, machine-readable instructions 126 may be similar to machine-readable instructions 106 of FIG. 1A, and processor(s) 136 may be similar to processor(s) 132 of FIG. 1A, but executed by server(s) 138. The instruction components may include one or more of model obtaining component 120, model training component 122, and/or other instruction components. In some implementations, components 120 and/or 122 may be included as machine-readable instructions 106, therefore the functionality of all the components are executed by server(s) 102. In some implementations, components 108, 110, 112, 114, 116, and/or 118 may be included as machine-readable instructions 126, therefore the functionality of all the components are executed by server(s) 138.

Model obtaining component 120 may be configured to obtain the training information from electronic storage 134. Model obtaining component 120 may be configured to obtain action determination model 124a from electronic storage 134. Action determination model 124a may be trained to determine the executable actions based on spoken actions and spoken entities input to trained action determination model 124b. Trained action determination model 124b may be the same as action determination model 124a but subsequent to training as described. The spoken actions and the spoken entities may be indicated in individual transcripts that represent the individual past conversation sessions. The executable actions may be actions that are plausible in relation to one or more of the spoken entities and based on the predefined list of actions. Individual ones of the executable actions may specify one or more of the (spoken) entities and one of the actions from the predefined list to be employed relative to the one or more spoken entities. The executable actions may be effectuated in response to user input indicating to effectuate such executable actions.

Model training component 122 may be configured to train action determination model 124a to determine the executable actions within the conversation sessions represented by the transcripts by using the transcripts, the action-entity pairs, the predefined list of actions, and/or other training information as training inputs. Furthermore, the final executed actions and/or other training information may be used as the training outputs. The training inputs and the training outputs may be information that are closely correlated. That is, for example, a reoccurring training input, e.g., the first action-entity pair and the second action-entity pair present in the transcripts, may correspond to a training output that occurs often, e.g., a particular executable action. Thus, such training input and training output may be closely correlated. As such, action determination model 124a is trained to determine the executable actions.

Action determination model 124a may be trained based on the training inputs, the training outputs, and/or other information by using known and/or novel machine learning techniques and/or other training techniques. Action determination model 124a may include deterministic models, machine learning classifiers, and/or other machine learning techniques. In some implementations, action determination model 124a may be continuously or periodically trained based on the training information as more of the training information is obtained and stored to electronic storage 134, and/or as model obtaining component 120 obtains access to other electronic storage. That is, while action determination model 124a is not being employed (i.e., trained action determination model 124b herein), action determination model 124a may be continuously trained based on the training information and/or other information. In some implementations, action determination model 124a may be trained periodically every week, every month, or other period of time, or at a point in time that new training information is obtained or accessible.

Model training component 122 may be configured to store trained entity recognition model 124b to electronic storage 134, electronic storage 130 of FIG. 1A, and/or other storage. In some implementations, electronic storage 130 and electronic storage 134 may be cloud-based storage and/or resources that processor(s) 132 of FIG. 1A and 136 of FIG. 1B, and instruction components thereof, may be accessed via network 140. In some implementations, electronic storage 130 and electronic storage 134 may be native to server(s) 102 and 138, respectively, and additional cloud-based storage and/or resources may be utilized to store the information described herein in addition to electronic storage 130 and electronic storage 134. The additional cloud-based storage and/or resources may be accessed via network 140.

Referring to FIG. 1A, server(s) 102 may be configured by machine-readable instructions 106, may include electronic storage 130, and/or other elements. Electronic storage 130 may store the predefined list of actions that are executable to provide care for a subject, trained action determination model 124b, electronic medical records for subjects, and/or other information. Individual ones of the electronic medical records may include identifying information of the individual subjects, current medications, current allergies, current illnesses and conditions, test results, notes related to the individual subjects, and/or other information. In some implementations, the individual electronic medical records may include past procedures, past notes related to the individual subjects, past notes related to the past visits or the past procedures, past notes related to the test results, past medications, past allergies, past illnesses and conditions, and/or other past information about the individual subjects. By way of non-limiting example, electronic storage 130 may store an electronic medical record for the subject.

Machine-readable instructions 106 may include one or more instruction components. The instruction components may include computer program components. The instruction components may include one or more of information obtaining component 108, transcript generating component 110, pair determination component 112, model utilizing component 114, feasibility component 116, recommendation effectuating component 118, and/or other instruction components.

Information obtaining component 108 may be configured to obtain the audio information that represents sounds captured by client computing platforms 104. The sounds may convey utterances from participants during individual conversation sessions. In some implementations, the conversation sessions may be during scheduled visits. The participants in the individual conversation sessions may include the one or more caregivers, the subject, and/or other participants. By way of non-limiting example, the conversation sessions may include the first conversation session between a caregiver and the subject.

In some implementations, the audio information may be obtained in an ongoing manner. The term "ongoing manner", as used herein, may refer to continuing to perform an action (e.g., obtain) continuously or periodically (e.g., every 30 seconds, every minute, every hour, etc.) until receipt of an indication to terminate. That is, information obtaining component 108 may be continuously determining whether the audio input devices of client computing platform 104 are detecting any sounds from participants.

In some implementations, the audio information may include digital audio signals that encode sounds of individual utterances of the participants, a recording of the individual utterances of the participants, and/or other audio information. In some implementations, the sounds conveying the utterances of the participants may be detected by the audio input device, such as a microphone, of client computing platform 104. In some implementations, the sounds may be converted to the digital audio signals by converting analog waves to the digital audio signals by precisely measuring the analog waves at consistent and frequent intervals. The recording of the individual utterances may include a digital file of a reproduction of the digital audio signals that cause the sounds, and thus convey the utterances, the digital audio signals, and/or other recording. In some implementations, information obtaining component 108 may be configured to generate the audio information based on the sounds in response to silence that follows individual ones of the utterances from the different participants, a change in the participant speaking detected, and/or user input via the user interface elements (e.g., selecting a virtual button). In some implementations, the silence may be for a particular amount of time that may be fixed or modifiable by the users. In some implementations, the audio information may be stored in electronic storage 130 in association with the subject.

Transcript generating component 110 may be configured to generate transcripts representing the utterances by the participants in the individual conversation sessions by performing speech recognition on the audio information. The transcripts may be generated by performing known and/or novel speech recognition techniques on the audio information. In some implementations, the generation of the individual transcripts may be in the ongoing manner. In some implementations, the audio information may include audio segments. The audio segments may convey the individual utterances or sets of utterances. Thus, information obtaining component 108 may be configured to generate transcript segments, that thus comprise the individual transcripts, based on the individual audio segments. By way of non-limiting example, a first transcript representing the utterances by the participants may be generated.

Pair determination component 112 may be configured to determine, based on the individual transcripts, individual prospective pairs that each include a spoken action and one or more of the spoken entities included in the individual transcripts. The individual prospective pairs may be the same as the action-entity pairs described herein but derived from the transcripts that represent the conversation sessions during visits when system 100 is being employed. By way of non-limiting example, the individual prospective pairs that each include the spoken action and one or more the spoken entities included in the first transcript may be determined based on the first transcript.

Determining the prospective pairs may include determining individual spoken actions included in the individual transcripts, individual spoken entities included in the transcripts, and/or other information from the transcripts. In some implementations, such information may be determined based on the audio information that the transcripts represent. In some implementations, determining the spoken actions and/or the one or more spoken entities may include employing known and/or novel natural language processing techniques based on phrases, semantics, syntax, and/or other text conveying natural language included in the transcripts. In some implementations, determining the one or more spoken entities may be based on the respective electronic medical records of the subjects such that the one or more spoken entities are relevant to the subjects as indicated by their electronic medical records. For example, the subject may have multiple allergies and the electronic medical record of the subject may indicate the multiple allergies. Thus, determining the spoken entities in the first transcript may contemplate the multiple allergies.

In some implementations, alternative to the spoken actions described herein, inferred actions may be determined based on the transcripts, the audio information, and/or other information. Individual ones of the inferred actions may indirectly refer to the individual actions included in the predefined list of actions as indicated by the transcripts, the audio information, and/or other information. Determining the inferred actions may include employing known and/or novel natural language processing techniques that analyze syntax, semantics, terms spoken, and/or other information conveyed in the transcripts and/or the audio information. Thus, the individual action-entity pairs described herein may include individual inferred actions and the one or more entities.

In some implementations, the prospective pairs determined based on the individual transcripts may include sets of duplicate ones of the prospective pairs. That is, for example, during the first conversation session, one or more of the participants may utter a first spoken action and a first spoken entity twice. Based on such, a first prospective pair and a second prospective pair that both include the first spoken action and the first spoken entity may be determined. As another example, during the first conversation session, one or more of the participants may utter the first spoken action and the first spoken entity, and a second spoken action that is similar to the first spoken action and the first spoken entity. Based on such, the first prospective pair may be determined and a third prospective pair including the second spoken action and the first spoken entity may be determined.

Pair determination component 112 may be configured to determine whether the spoken actions included in the prospective pairs are included in the predefined list of actions. In some implementations, determining whether the spoken actions are included in the predefined list may include determining whether the spoken actions are the same as the alternative references associated with the actions included in the predefined list. In some implementations, determining whether the spoken actions included in the prospective pairs are included in the predefined list may include employing novel and/or known semantic analysis techniques that determine whether the individual spoken actions refer to one of the actions included in the predefined list. For example, utterance of "let's meet up again next Wednesday" may refer to a schedule action included in the predefined list.

In response to determining that the individual spoken actions are not included in the predefined list, pair determination component 112 may generate and present an error message. The error message may convey that the spoken action is not executable by system 100. In some implementations, the error message may convey a request to utter another action or utter the spoken action differently.

Responsive to determination that the individual spoken actions are included in the predefined list, model utilizing component 114 may be configured to provide the prospective pairs to trained action determination model 124*b* as input. Model utilizing component 114 may be configured to obtain, from trained action determination model 124*b*, the executable actions as its output. The executable actions obtained may distill the sets of duplicates to singular executable actions for each of the sets. As described, the executable actions may be actions that are plausible in relation to some entities based on the predefined list of actions. The executable actions may not indicate whether the actions are plausible in relation to the specific one or more spoken entities, but whether the actions are plausible in relation to any entity of the entity class.

Feasibility component 116 may be configured to determine whether the individual executable actions are viable and already fulfilled based on external resources 128, electronic storage 130, and/or other resources or storage. While the executable actions do not indicate whether the actions are plausible in relation to the specific one or more spoken entities, feasibility component 116 may be configured to determine whether the actions are plausible in relation to the specific one or more spoken entities.

External resources 128 may indicate schedules, resource inventory, resource fulfillment information, and/or other information. The schedules may indicate dates and times when the participants are available and unavailable. The resource inventory may indicate whether individual items are available, how many of the items are available, unavailable, an amount of the items that are backordered, and/or status of future inventory. The status of the future inventory may indicate that a given item is not going to be available, an estimated time until the given item is available again, and/or other statuses. The items may include, by way of non-limiting example, medical devices, medications, supplies (e.g., bandage wrap), and/or other items. The resource fulfillment information may indicate whether ordered items are fulfilled. Ordered items may be items that are ordered for the subject. Fulfillment of the ordered items may indicate that the subject gained possession of the ordered items.

External resources 128 may include virtual calendars for the caregivers, virtual calendars for the subjects, a virtual resource database (e.g., for medical devices), and/or other resources. In some implementations, the resource fulfillment information may include prescriptions, the medical devices (e.g., sleep apnea machine), supplies, and/or other items that were fulfilled. For example, in some implementations, the electronic medical records stored in electronic storage 130 may indicate the prescriptions that were fulfilled. In some implementations, external resources 128 may include a pharmaceutical database that records prescriptions available and fulfilled prescriptions may provide the resource fulfillment information.

Plausibility of the actions specifically in relation the one or more spoken entities may refer to whether the actions may actually be executed given the one or more spoken entities. For example, a first executable action may include a first action that is the schedule action, a second spoken entity that is a particular date and time, a third spoken entity that is a particular time span, and a fourth spoken entity that is one of the appointments (e.g., follow-up). Feasibility component 116 may be configured to determine, for example, whether a virtual schedule of the caregiver is accessible and modifiable, and/or whether a virtual schedule of the subject is accessible, modifiable, or be advised.

Determining fulfillment may refer to determining whether the actions specifically in relation to the one or more spoken entities were already executed and/or already exist. For example, feasibility component 116 may be configured to determine whether the virtual calendars of the caregiver and the subject already indicate a scheduled follow-up appointment on the particular date and time for the particular time span.

Responsive to the individual executable actions being viable and not already fulfilled, recommendation effectuating component 118 may be configured to effectuate presentation of action recommendations that include the executable actions via client computing platform 104 of the caregiver.

In some implementations, recommendation effectuating component 118 may be configured to generate the action recommendations based on the executable actions so that the action recommendations convey the executable actions. In some implementations, generation of the action recommendations may include providing the executable actions to a machine learning model that is configured to generate the action recommendations. The machine learning model may include a large language model, and/or other machine learning models that are configured to generate text that conveys specific information (i.e., the executable actions).

By way of non-limiting example, in some implementations, the large language model may be Transformer-based which has been previously trained on a plurality of generic information to generate output text (e.g., the action recommendations specifying the executable actions) based on input text received (e.g., the executable actions). The large language model may be Encoder-Decoder based with a plurality of model parameters where the large language model is trained on a variety of language tasks. The large language model may utilize both the Encoder and Decoder components of the architecture during training. The Decoder may only be used for generation of the output text. In some implementations, the large language model may be fine-tuned on specific training information or open-source clinical information, which may improve the quality and accuracy of the determined executable actions described herein.

Individual ones of the action recommendations may include an accept interface element that indicates to effectuate the individual executable actions and a deny interface element that indicates to archive the individual executable actions. Archiving the individual executable actions may include not effectuating the individual executable actions and storing the individual executable actions in electronic storage 130, 134, and/or other electronic storage. Effectuating the individual executable actions may include executing the functions, code, and/or the specifications to cause the action to complete with respect to the one or more spoken entities corresponding to the action (e.g., schedule the appointment, send an appointment invite).

The accept interface element and the deny interface element may include user interface elements, such as virtual buttons or sliders, to accept or deny via user input effectuation of the executable actions. That is, the executable actions may not officially be effectuated until the caregiver (or other authorized users) provides the user input to officially accept effectuation of or denial of effectuation of the executable actions.

An individual user interface element may be configured to be selected or manipulated by users (e.g., the caregiver) to cause a result (e.g., effectuate the executable action specified in the action recommendation). The user interface elements may be configured to facilitate user interaction with the user interface, user entry, and/or selection. By way of non-limiting illustration, the user interface elements may include one or more of text input fields, drop down menus, check boxes, display windows, virtual buttons, and/or other user interface elements.

In some implementations, the individual action recommendations may be presented contemporaneously with a note that is generated based on the first conversation session. The note may be generated in real time while the first conversation session is transpiring or subsequent to termination of the first conversation session.

In some implementations, the one or more spoken entities of the executable actions and included in the action recommendations may be presented as user interface elements that enable modification of the one or more spoken entities to one or more input entities. The input entities may be entities that are input by the caregiver via one or more of the user interface elements (e.g., drop down menu, text body). For example, the spoken entity included in the presented action recommendation may convey a particular medication (e.g., ibuprofen), and the caregiver may modify the spoken entity so that an input entity (e.g., acetaminophen) corresponds to the spoken action included in the presented action recommendation rather than the spoken entity.

Recommendation effectuating component 118 may be configured to receive, via client computing platform 104, the user input that indicates whether to effectuate the individual executable actions. The user input may include selecting the accept interface element, selecting the deny user interface element, and/or a voice command that conveys acceptance or denial of the action recommendations and thus the corresponding executable actions. Recommendation effectuating component 118 may be configured to effectuate, responsive to the user input indicating to effectuate the individual executable actions, the respective individual executable actions.

Figure 3A:
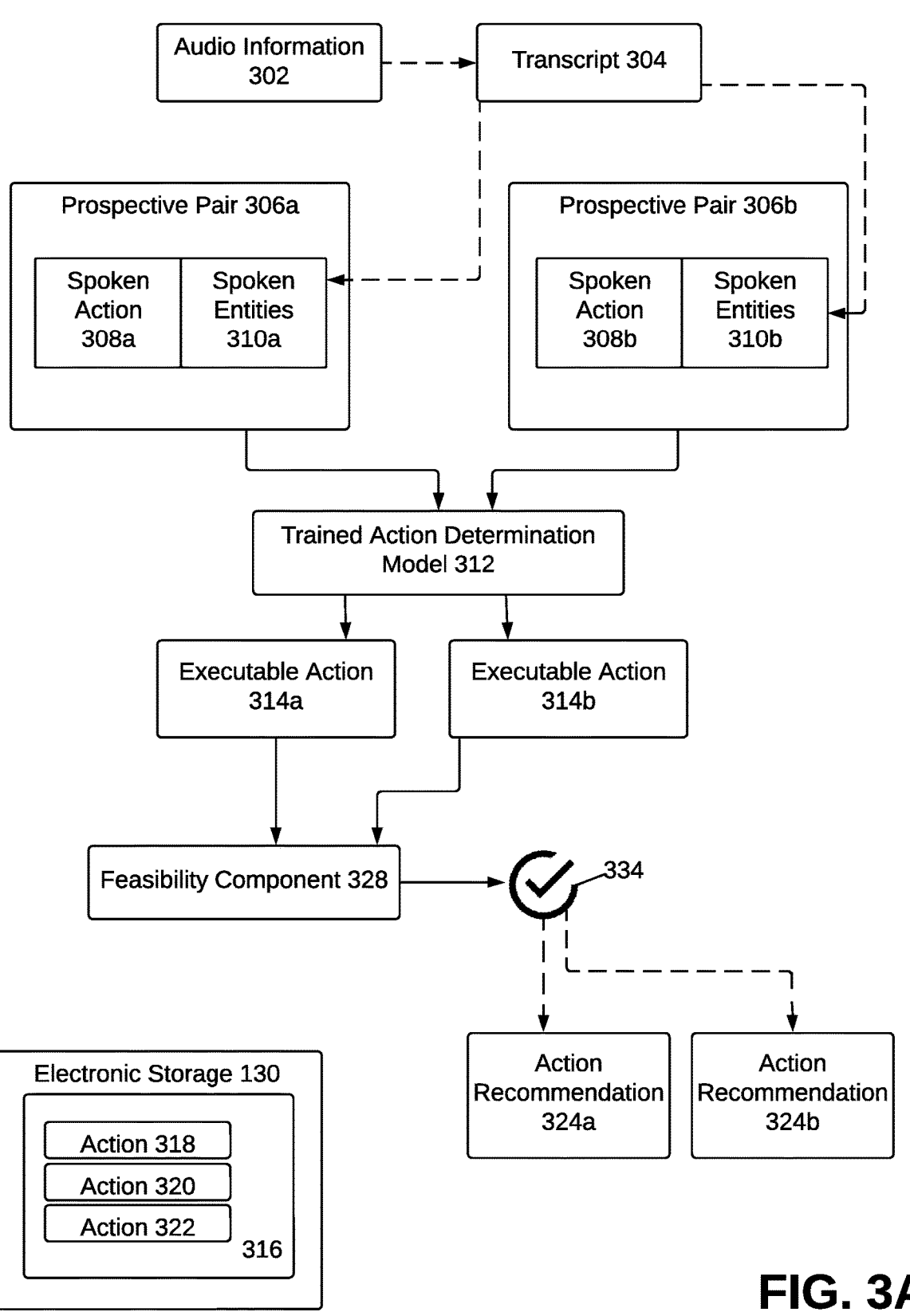
FIG. 3A-B illustrates an example implementation of the system configured to provide action recommendations based on audio information, in accordance with one or more implementations.

FIG. 3A illustrates obtained audio information 302 that represents sounds that convey utterances from participants (not illustrated) during a given conversation session. Transcript 304 may be generated based on audio information 302 to textually represent the utterances. Transcript 304 may include spoken action 308a and spoken entities 310a uttered in relation to spoken action 308a, and spoken action 308b and spoken entities 310b uttered in relation to spoken action 308b. Spoken action 308a and spoken entities 310a may be determined as a prospective pair 306a based on transcript 304, and spoken action 308b and spoken entities 310b may be determined as a prospective pair 306b based on transcript 304. Responsive to determination that spoken actions 308a and 308b are included in or refer to actions 320 and 322, respectively, included in predefined list of actions 316 stored in electronic storage 130 (the same as in FIG. 1), prospective pairs 306a and 306b may be provided to trained action determination model 312 (the same or similar to trained action determination model 124b of FIG. 1) as input. Trained action determination model 312 may be trained to determine and output executable actions 314a and 314b based on prospective pairs 306a and 306b, respectively. Executable action 314a may include action 320 and spoken entities 310a, and executable action 314b may include action 322 and spoken entities 310b. Feasibility component 328 may determine whether executable actions 314a-b are viable and not fulfilled already. Upon determination that executable actions 314a-b are viable and not fulfilled already (334), action recommendations 324a and 324b, respectively, may be generated.

Figure 3B:
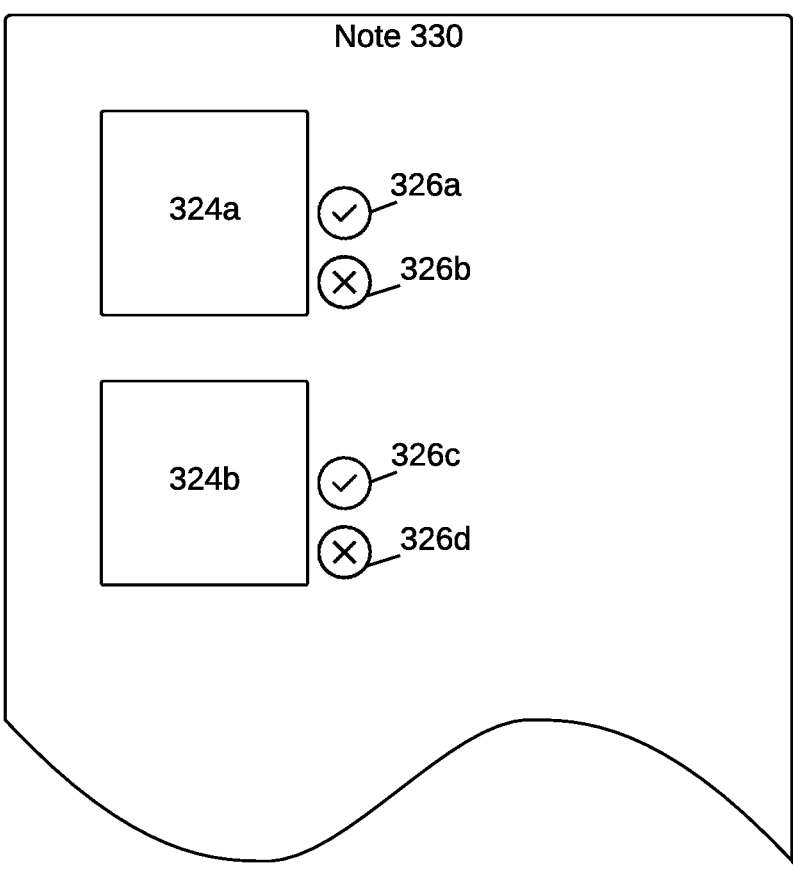

FIG. 3B may illustrate a note 330 that is generated to document the given conversation session of FIG. 3A. Action recommendation 324a that includes action 320 and spoken entities 310a, and action recommendation 324b that includes action 322 and spoken entities 310b, as described in FIG. 3A, may be generated and presented in note 330 for a caregiver (not illustrated) to view. User interface elements 326a and 326b may be presented in association with action recommendation 324a to enable the caregiver or other user to accept or archive, respectively, effectuation of action recommendation 324a. Similarly, user interface elements 326c and 326d may be presented in association with action recommendation 324b to enable the caregiver or other user to accept or archive, respectively, effectuation of action recommendation 324b.

Referring back to FIG. 1, in some implementations, server(s) 102, client computing platform(s) 104, and/or external resources 128 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 128 may be operatively linked via some other communication media.

A given client computing platform 104 may include one or more processors configured to execute computer program components. The computer program components may be configured to enable an expert or user associated with the given client computing platform 104 to interface with system 100 and/or external resources 128, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smart-phone, a gaming console, and/or other computing platforms.

External resources 128 may include sources of information outside of system 100, external entities participating with system 100, and/or other resources. In some implementations, some or all of the functionality attributed herein to external resources 128 may be provided by resources included in system 100.

Server(s) 102 may include electronic storage 130, one or more processors 132, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, 118, 120, and/or 122, and/or other components. Processor(s) 132 may be configured to execute components 108, 110, 112, 114, 116, 118, 120, and/or 122, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, and/or 122 are illustrated in FIG. 1 as being implemented within a single processing unit, in implementations in which processor(s) 132 includes multiple processing units, one or more of components 108, 110, 112, 114, 116, 118, 120, and/or 122 may be implemented remotely from the other components. The description of the functionality provided by the different components 108, 110, 112, 114, 116, 118, 120, and/or 122 described below is for illustrative purposes, and is not intended to be limiting, as any of components 108, 110, 112, 114, 116, 118, 120, and/or 122 may provide more or less functionality than is described. For example, one or more of components 108, 110, 112, 114, 116, 118, 120, and/or 122 may be eliminated, and some or all of its functionality may be provided by other ones of components 108, 110, 112, 114, 116, 118, 120, and/or 122. As another example, processor(s) 132 may be configured to execute one or more additional components that may perform some or all of the functionality attributed below to one of components 108, 110, 112, 114, 116, 118, 120, and/or 122.

Figure 2:
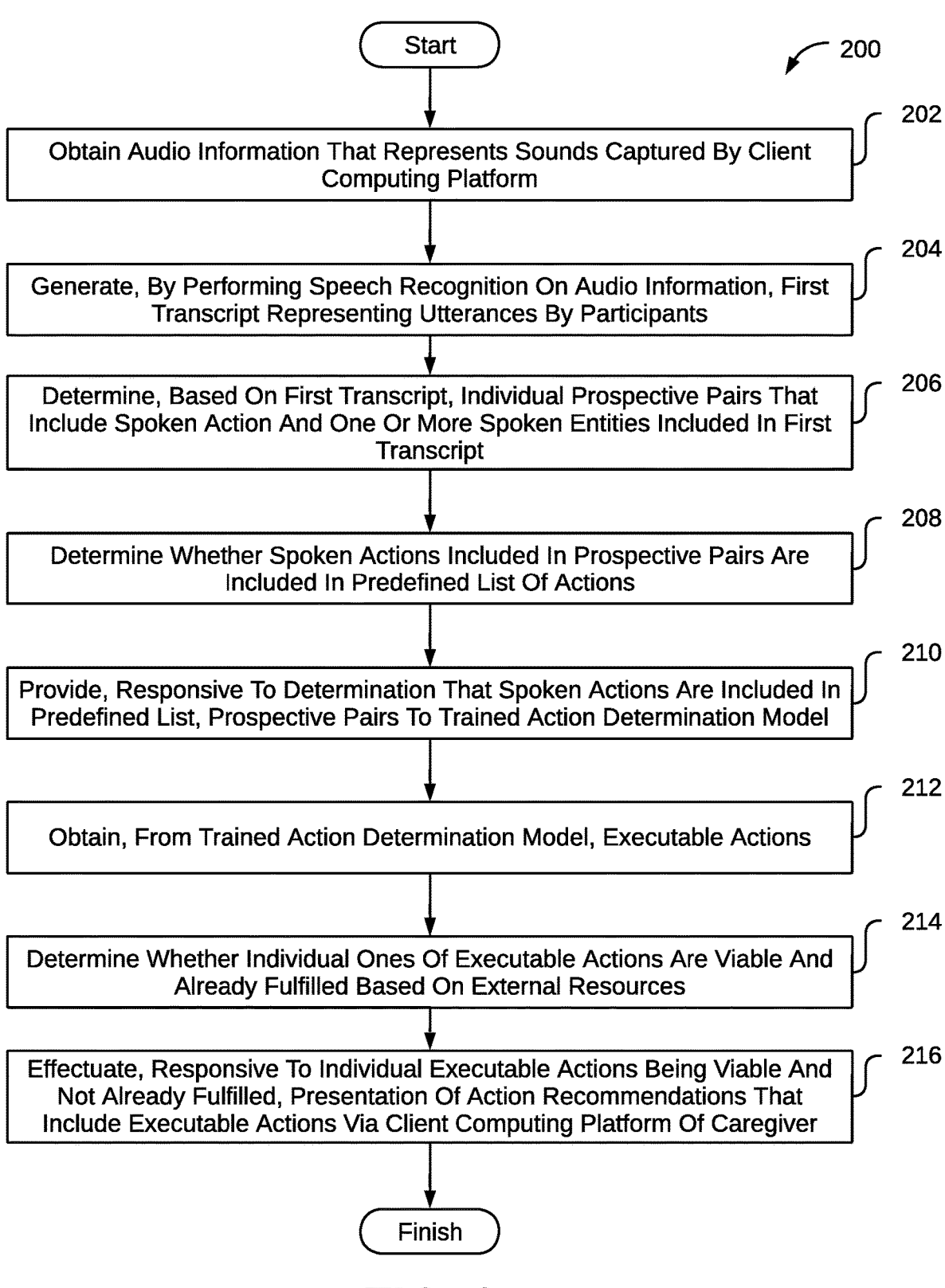
FIG. 2 illustrates a method to provide action recommendations based on audio information, in accordance with one or more implementations.

FIG. 2 illustrates a method 200 to provide action recommendations based on audio information, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining audio information that represents sounds captured by a client computing platform. The sounds convey utterances from participants during the first conversation session. The participants may include a caregiver and a subject. Operation 202 may be performed by one or more hardware processors configured by machine-readable instructions including a component that is the same as or similar to information obtaining component 108, in accordance with one or more implementations.

An operation 204 may include generating, by performing speech recognition on the audio information, a first transcript representing the utterances by the participants. Operation 204 may be performed by one or more hardware processors configured by machine-readable instructions including a component that is the same as or similar to transcript generating component 110, in accordance with one or more implementations.

An operation 206 may include determining, based on the first transcript, individual prospective pairs that include a spoken action and one or more spoken entities included in the first transcript. Operation 206 may be performed by one or more hardware processors configured by machine-readable instructions including a component that is the same as or similar to pair determination component 112, in accordance with one or more implementations.

An operation 208 may include determining whether the spoken actions included in the prospective pairs are included in a predefined list of actions stored in electronic storage. Operation 208 may be performed by one or more hardware processors configured by machine-readable instructions including a component that is the same as or similar to pair determination component 112, in accordance with one or more implementations.

An operation 210 may include providing, responsive to determination that the spoken actions are included in the predefined list, the prospective pairs to a trained action determination model. Operation 210 may be performed by one or more hardware processors configured by machine-readable instructions including a component that is the same as or similar to model utilizing component 114, in accordance with one or more implementations.

An operation 212 may include obtaining, from the trained action determination model, the executable actions. Operation 212 may be performed by one or more hardware processors configured by machine-readable instructions including a component that is the same as or similar to model utilizing component 114, in accordance with one or more implementations.

An operation 214 may include determining whether individual ones of the executable actions are viable and already fulfilled based on external resources. The external resources may indicate at least schedules, resource inventory, resource fulfillment information, and/or other information. Operation 214 may be performed by one or more hardware processors configured by machine-readable instructions including a component that is the same as or similar to feasibility component 116, in accordance with one or more implementations.

An operation 216 may include effectuating, responsive to the individual executable actions being viable and not already fulfilled, presentation of action recommendations that include the executable actions via the client computing platform of the caregiver. Operation 216 may be performed by one or more hardware processors configured by machine-readable instructions including a component that is the same as or similar to recommendation effectuating component 118, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to provide action recommendations based on audio information, the system comprising:
electronic storage that stores (a) a trained action determination model trained to determine executable actions within a first conversation session represented by a first transcript, and (b) a predefined list of actions that are executable to provide care for subjects,
wherein the trained action determination model is trained based on (i) transcripts of conversation sessions, (ii) action-entity pairs present in the transcripts, (iii) final executed actions, and (iv) the predefined list of the actions,
wherein individual ones of the executable actions specify one or more entities and one of the actions from the predefined list to be employed relative to the one or more entities; and
one or more processors configured by machine-readable instructions to:
obtain audio information that represents sounds captured by a client computing platform, wherein the sounds convey utterances from participants during the first conversation session, wherein the participants include a caregiver and a subject;
generate, by performing speech recognition on the audio information, the first transcript representing the utterances by the participants;
determine, based on the first transcript, prospective pairs that include (i) spoken actions and (ii) one or more spoken entities included in the first transcript;
determine whether the spoken actions included in the prospective pairs are included in the predefined list;
provide, responsive to determination that the spoken actions are included in the predefined list, the prospective pairs to the trained action determination model;
obtain, from the trained action determination model, the executable actions;
determine whether individual ones of the executable actions are (i) viable and (ii) already fulfilled based on external resources, wherein the external resources indicate at least schedules, resource inventory, and resource fulfillment information; and
effectuate, responsive to the individual ones of the executable actions being viable and not already fulfilled, presentation of action recommendations that include the executable actions via the client computing platform of the caregiver.

2. The system of claim 1, wherein the one or more spoken entities of the executable actions are included in the action recommendations and are presented as user interface elements that enable modification of the one or more spoken entities.

3. The system of claim 1, wherein the one or more processors are further configured by the machine-readable instructions to:
receive, via the client computing platform, user input that indicates whether to effectuate the individual ones of the executable actions; and
effectuate, responsive to the user input indicating to effectuate the individual ones of the executable actions, the individual ones of the executable actions.

4. The system of claim 3, wherein individual ones of the action recommendations include an accept interface element that indicates to effectuate the individual ones of the executable actions and a deny interface element that indicates to archive the individual ones of the executable actions, wherein the user input includes selecting the accept interface element.

5. The system of claim 4, wherein the individual ones of the action recommendations are presented contemporaneously with a note that is generated based on the first conversation session.

6. The system of claim 1, wherein the electronic storage stores electronic medical records for the subjects which include an electronic medical record for the subject, wherein determining the one or more spoken entities related to the spoken actions is based on the electronic medical record.

7. The system of claim 1, wherein the prospective pairs include sets of duplicate ones of the prospective pairs, wherein the executable actions obtained distill the sets to a single executable action.

8. A method to provide action recommendations based on audio information, the method comprising:

obtaining audio information that represents sounds captured by a client computing platform, wherein the sounds convey utterances from participants during a first conversation session, wherein the participants include a caregiver and a subject;

generating, by performing speech recognition on the audio information, a first transcript representing the utterances by the participants;

determining, based on the first transcript, prospective pairs that include (i) spoken actions and (ii) one or more spoken entities included in the first transcript;

determining whether the spoken actions included in the prospective pairs are included in a predefined list of actions, wherein electronic storage stores (a) the predefined list of the actions that are executable to provide care for subjects, (b) a trained action determination model trained to determine executable actions within the first conversation session represented by the first transcript, wherein the trained action determination model is trained based on (i) transcripts of conversation sessions, (ii) action-entity pairs present in the transcripts, (iii) final executed actions, and (iv) the predefined list of the actions, wherein individual ones of the executable actions specify one or more entities and one of the actions from the predefined list to be employed relative to the one or more entities;

providing, responsive to determination that the spoken actions are included in the predefined list, the prospective pairs to the trained action determination model;

obtaining, from the trained action determination model, the executable actions;

determining whether individual ones of the executable actions are (i) viable and (ii) already fulfilled based on external resources, wherein the external resources indicate at least schedules, resource inventory, and resource fulfillment information; and effectuating, responsive to the individual ones of the executable actions being viable and not already fulfilled, presentation of action recommendations that include the executable actions via the client computing platform of the caregiver.

9. The method of claim 8, wherein the one or more spoken entities of the executable actions are included in the action recommendations and are presented as user interface elements that enable modification of the one or more spoken entities.

10. The method of claim 8, further comprising:

receiving, via the client computing platform, user input that indicates whether to effectuate the individual ones of the executable actions; and effectuating, responsive to the user input indicating to effectuate the individual ones of the executable actions, the individual ones of the executable actions.

11. The method of claim 10, wherein individual ones of the action recommendations include an accept interface element that indicates to effectuate the individual ones of the executable actions and a deny interface element that indicates to archive the individual ones of the executable actions, wherein the user input includes selecting the accept interface element.

12. The method of claim 11, wherein the individual ones of the action recommendations are presented contemporaneously with a note that is generated based on the first conversation session.

13. The method of claim 8, wherein the electronic storage stores electronic medical records for the subjects which include an electronic medical record for the subject, wherein determining the one or more spoken entities related to the spoken actions is based on the electronic medical record.

14. The method of claim 8, wherein the prospective pairs include sets of duplicate ones of the prospective pairs, wherein the executable actions obtained distill the sets to a single executable action.

* * * * *